United States Patent [19]

Katahira

[11] Patent Number: 4,892,415
[45] Date of Patent: Jan. 9, 1990

[54] MINIATURE LINEAR GUIDE APPARATUS
[75] Inventor: Masayuki Katahira, Maebashi, Japan
[73] Assignee: Nippon Seiko Kabushiki Kaisha, Tokyo, Japan
[21] Appl. No.: 308,725
[22] Filed: Feb. 9, 1989
[30] Foreign Application Priority Data Feb. 10, 1988 [JP] Japan .................................. 63-16979

[51] Int. Cl.<sup>4</sup> ............................................ F16C 29/06
[52] U.S. Cl. ...................................................... 384/45
[58] Field of Search ................................... 384/43–45; 464/168

[56] References Cited

U.S. PATENT DOCUMENTS

| | | | |
|---|---|---|---|
| 4,647,226 | 3/1987 | Mottate | 384/45 |
| 4,778,284 | 10/1988 | Teremachi | 384/45 |
| 4,799,806 | 1/1989 | Seki | 384/45 |
| 4,806,022 | 2/1989 | Takahiro | 384/45 |

Primary Examiner—Thomas R. Hannon
Attorney, Agent, or Firm—Basile and Hanlon

[57] ABSTRACT

A slider mounted movably on a guide rail interposing many balls therebetween is constructed by assembling as a unit, a race member having ball rolling grooves at both sides, a circulator having ball circulating grooves opening upwardly, and a cap sandwiched between the race member and the circulator. The cap is formed with column members protruding from the upper surface upwardly and aligned axially, and each of the column members has a threaded hole for attaching a member to be driven to the slider. The race member has through holes for the column members, so that the column members having the screw holes are exposed.

3 Claims, 4 Drawing Sheets

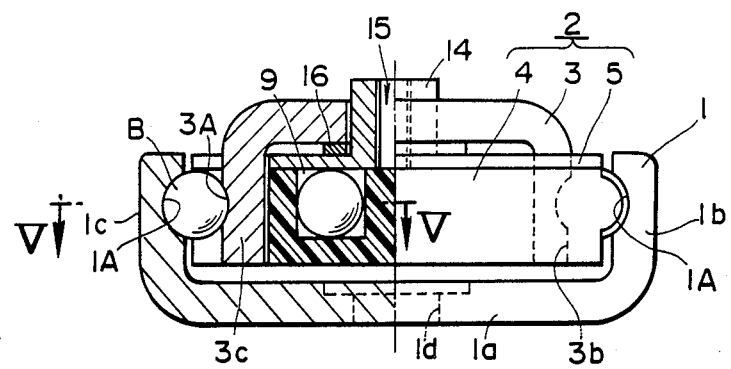
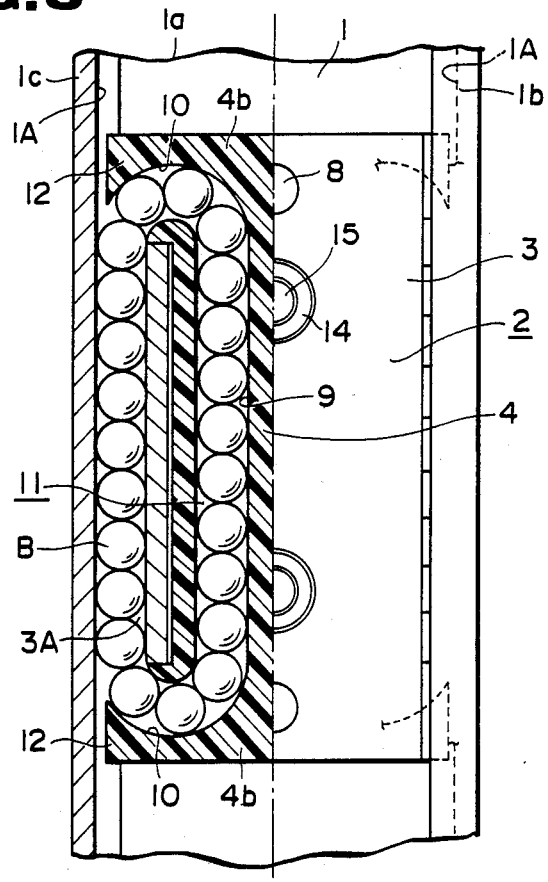

FIG. 6 *(PRIOR ART)*
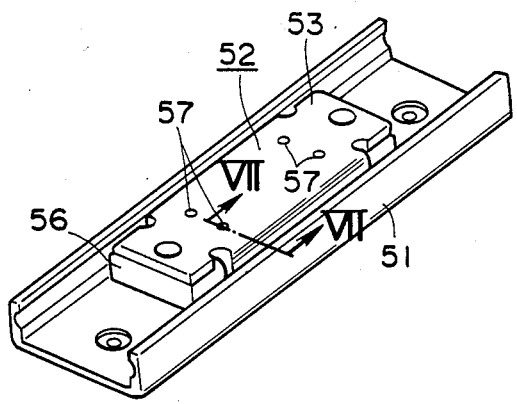
FIG. 7 *(PRIOR ART)*
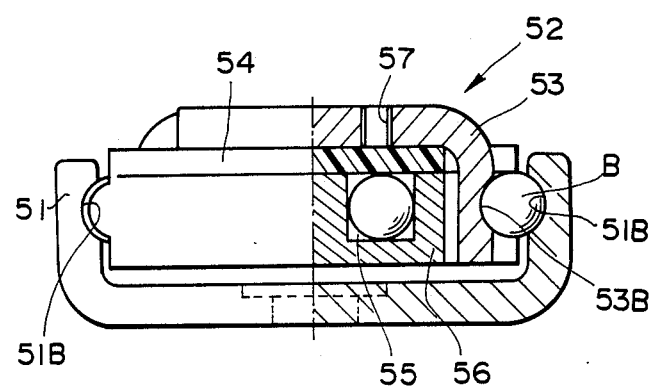

MINIATURE LINEAR GUIDE APPARATUS

BACKGROUND OF THE INVENTION

1. Field of the Invention

The present invention relates to a miniature linear guide apparatus which is light, compact, highly accurate, and useful as a driving device for a hard disk, a floppy disk, or a memory (CD-ROM) device utilizing a compact disk, and in particular, relates to an improvement in the attaching structure of a member to be driven to ensure high accuracy.

2. Description of the Relevant Art

A miniature linear guide apparatus of this type is shown, for example, in FIGS. 6 and 7.

In this apparatus, a slider 52 is assembled, for longitudinal movement, to a guide rail 51 having a U-shaped cross section. The slider 52 is formed integrally by fitting a cap 54 having a flat plate shape and a circulator 56 having ball circulating paths 55 into a recess of a race member 53 having an inverted U-shaped cross section.

The race member 53 has longitudinally extending ball rolling grooves 53B formed in both side surfaces, and the guide rail 51 has similar ball rolling grooves 51B formed in both inner surfaces of its side walls respectively opposing the ball rolling grooves 53B of the race member 53. Steel balls B are inserted in the paths formed by opposing ball rolling grooves 51B and 53B. These balls B circulate infinitely through the ball circulating paths 55 formed in the circulator 56, thereby allowing the slider 52 to move linearly. The race member 53 of the slider 52 has screw holes 57 formed in its flat portion, and a member to be driven (not shown) can be attached directly to the race the race member 53 by screws.

However, the miniature linear guide apparatus involves a problem in that when a member to be driven is attached to the race member 53 of the slider 52, the screws inserted through the screw holes 57 must be clamped. Conseqently, the race member 53 which is made of a thin steel plate is deformed, and as a result, the clearance between the outer surface of the race member 53 and the inner surface of the guide rail 51, and an opposing positional relationship between the race member 53 and the guide member 51 are changed. Consequently, dimensional tolerances of the ball rolling grooves 53B, and movement accuracy and positional accuracy of the slider 52 deteriorate proving it difficult to achieve a miniature linear guide with high accuracy.

Furthermore, when the member to be driven is fixed by screws, the depth of clamping is dependent on the plate thickness of the race member 53, and the interference area available for clamping is decreased as the plate thickness is decreased. Thus, it becomes difficult to make the apparatus small in size and light in weight.

SUMMARY OF THE INVENTION

It is an object of the present invention to provide a linear guide apparatus in which a force applied to fix a member to be driven to a slider does not act on the race member, and an adequate interference for clamping screws for attaching and retaining the member to be driven to the slider can be ensured independent of the plate thickness of the race member, thereby ensuring a highly accurate, small in size, and lightweight apparatus.

In order to achieve the above object, in accordance with the invention, a miniature linear guide apparatus comprises a guide rail having a U-shaped cross section, axially extending ball rolling grooves formed in inner surfaces of both side walls, and a slider formed integrally by assembling a race member having an inverted U-shaped cross section with axially extending ball rolling grooves formed in both outer side surfaces respectively opposing the ball rolling grooves of the guide rail, a circulator fitted within a recess of the race member having ball circulating paths formed as grooves in the inside thereof, and a cap for covering the ball circulating paths of the circulator. The slider is loosely fitted within the U-shaped cross section of the guide rail and supported therein through many balls interposed between the rolling grooves of the guide rail and the race member. The cap is provided with column members which protrude outwardly from an upper surface facing the race member; and the column members are bored with threaded holes for attaching the member to be driven by screws, or other suitable fixing means. The race member is formed with through holes for the column members at positions corresponding to the column members.

Since the column members are independent of the race member, a clamping force exerted by the screws does not act on the race member. Accordingly, a deformation of the race member due to the attaching of the member to be driven to the slider is avoided, and the groove interval between opposing ball rolling grooves and the parallelism thereof are not influenced entirely. As a result, high travelling accuracy and positioning accuracy of the slider can be ensured.

Moreover, since there is no need to form tapped holes or screw holes in the race member, the plate thickness of the race member can be reduced independent of the fixing screws, and the apparatus can be made small and light.

BRIEF DESCRIPTION OF THE DRAWINGS

FIG. 4 is a front view partially in section taken along the line IV—IV in FIG. 1;

FIG. 5 is a plane view partially in section taken along the line V—V in FIG. 4;

FIG. 6 is a perspective view of a prior art miniature linear guide apparatus; and FIG. 7 is a front view partially in section taken along the line VII—VII in FIG. 6.

DESCRIPTION OF THE PREFERRED EMBODIMENT

Figure 1:
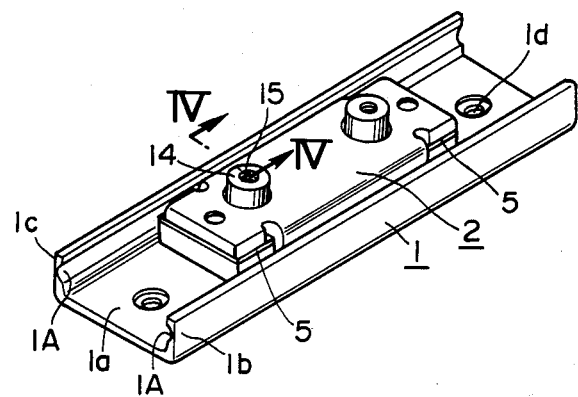
FIG. 1 is a perspective view of a miniature linear guide apparatus embodying the present invention.

With reference to FIGS. 1 to 5, a U-shaped guide rail 1, for guiding a slider 2, is made of steel and has a bottom plate 1a and side walls 1b and 1c, constituting guide surfaces, extending upwardly from both side edges of bottom plate 1a. The side walls 1b and 1c have longitudinally extending ball rolling grooves 1A respectively formed in the inner surfaces. These ball rolling grooves 1A are formed in parallel to each other, and have a cross section forming a so-called Gothic arch groove formed by two arcs in a V shape. Furthermore, holes 1d, for fixing screws, are formed in the bottom plate 1a to attach the guide rail 1 to a surface when the miniature guide apparatus is to be used.

The slider 2 is comprised of a race member 3 having an inverted U-shaped cross section and made of a thin steel plate, a circulator 4 made of a synthetic resin, and a cap 5 of a flat plate shape made of synthetic resin or mild steel and interposed between the race member 3 and the circulator 4.

The race member 3 has an outer width narrower than the inner width of the guide rail 1 between side walls 1b and 1c, and has an upper plate 3a and side walls 3b and 3c extending downwardly from both side edges. The race member 3 is disposed between the side walls 1b and 1c of the guide rail 1. The side walls 3b and 3c have axially extending ball rolling grooves 3A formed in the outer surfaces so that these ball rolling grooves 3A respectively oppose the ball rolling grooves 1A of the guide rail 1. A cross section of each of the ball rolling grooves 3A is a Gothic shape groove similar to that of the ball rolling grooves 1A of the guide rail 1. The upper plate 3a has extended portions 3d, which extend from opposite ends thereof in a longitudinal direction beyond side walls 3b and 3c. Each of the extended portions 3d has a pin inserting hole 6 with a spot facing 6a formed therein. Furthermore, a pair of through holes 7, for column members described later, are formed along the axial line.

The circulator, designated generally as 4, is formed by two halves divided along the axial line, and each half thereof is injection molded. The circulator 4 includes a truck portion 4a, having an E-shaped cross section, which is fitted into the U-shaped recess of the race member 3. Brim portions 4b extend axially from opposite ends of the trunk portion 4a. Each of the brim portions 4b has a column shaped circulator caulking pin 8 formed on the upper surface thereof. The integrally formed pins are split in two halves resulting in a split column shape.

In the inside of trunk portion 4a of circulator 4, there are formed ball return paths 9 comprising two parallel grooves having openings at the upper portions. The opposite ends of each ball return groove 9 are in communication with curved ball grooves 10 which are arcuate grooves formed in the brim portions 4b. As a result, the inner arcuate surface and the outer arcuate surface of the curved ball grooves 10 are continuously connected to the side walls of ball return paths 9 thereby forming a ball circulating path 11.

At the open end of the curved ball groove 10, the inner arcuate surface thereof is connected to the ball rolling groove 3A of the race member 3. Additionally, the outer arcuate surface of curved ball groove 10 extends outwardly to lie closely adjacent to the ball rolling groove 1A of guide rail 1 so that the tip end portion of the outer arcuate surface of the curved ball groove 10 is in close proximity to the bottom portion of the ball rolling groove 1A. A scooping protrusion 12 is formed to scoop balls B, inserted in the ball circulating path 11, smoothly by extending into ball rolling groove 1A.

The cap 5 has a central portion 5A for covering the ball return paths 9, and extending portions 5B for covering the curved ball grooves 10. Each of the extended portions 5B has an axially placed penetrating hole 13 for inserting the circulator caulking pin 8 therethrough. A pair of integrally formed column members 14 are provided on the cap 5. The column members 14 are aligned in the longitudinal direction of cap 5 at axially inward positions with respect to penetrating holes 13. Column members 14 are pedestals for clamping screws to fix the member to be driven to the slider 2, and threaded holes 15 are formed at the center thereof. The height of the column members 14 is determined to provide sufficient depth to ensure adequate clamping of the screw. Accordingly, when the plate thickness of the race member 3 is thin, the column members 14 may protrude beyond the upper surface of the slider 2. However, generally the level, or the overall height, of the upper surface of the slider 2 is important, and the protrusions at local positions can be permitted.

Figure 3:
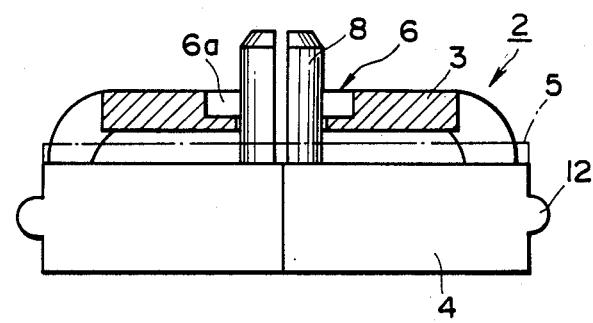
FIG. 3 is a front view, partially in section, of the slider in FIG. 1 showing the assembled structure.
Figure 2:
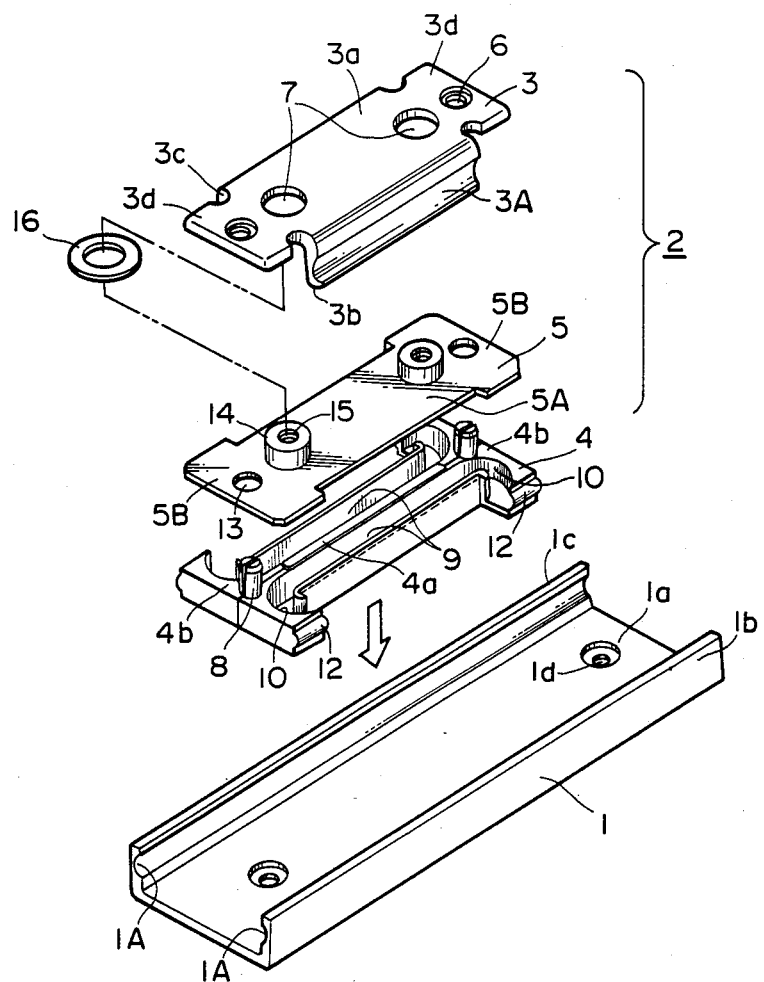
FIG. 2 is a perspective view of the disassembled parts of the apparatus of FIG. 1.

In assembling the slider 2, the circulator caulking pins 8, formed on the circulator 4, are inserted through the penetrating holes 13 formed in cap 5. Subsequently, the pins 8 are inserted through the pin inserting holes 6 formed in the race member 3 (FIG. 3). The protruding tip ends of the circulator caulking pins 8 are heated and pressed after the tip ends are softened. As a result, the heads of the circulator caulking pins 8 fill the spot facing portions of the pin inserting holes 6 and the race member 3, the circulator 4, and the cap 5 are secured as a unit to finish the assembling of the slider 2.

During assembly of the slider 2, an elastic washer 16, made of synthetic resin, is fitted to each of the column members 14 on the surface of the cap 5. As a result, the transmission of nonuniform force (for example, pinching) due to the securing of the member to be driven is reduced. By assembling the slider 2 in this manner, the ball return paths 9 and the curved ball grooves 10 are covered by cap 5, and thus, satisfactory ball circulating paths 11, having no stepped or uneven portions, can be formed.

This slider 2 is loosely fitted into the recess of the U-shaped guide rail 1, and many balls B are rollably inserted between the ball rolling grooves 1A of the guide rail 1 and the opposing ball rolling grooves 3A of the race member 3, and in the ball circulating paths 11. The balls B are held in the grooves 1A and 3A in a four-point contact state due to the Gothic arch shape of the grooves. As a result, the slider 2 is supported by the guide rail 1 without shaking vertically or laterally, while permitting axial movement while the balls B are rolling.

Next, the operation or function of the slider assembly will be described.

The guide rail 1 is fixed on a desired surface by screws, or other fasteners, by utilizing the fixing screw holes 1d. On the other hand, a member to be driven is fixed to the slider 2. In this case, screws which have been inserted through predetermined holes of the member to be driven engage the threaded holes 15 of the column members 14 which are exposed on the upper surface of the slider 2, and the screws are clamped. The clamping force is imparted to the cap 5 through the column members 14, and this force does not act on the race member 3 directly. Consequently, deformation of the race member 3 as in the prior art apparatus, is avoided. In other words, there is no influence on the ball rolling grooves 3A at both sides of the race member 3, and accurate, smooth rolling of the balls B can be ensured.

Furthermore, by retaining a suitable height of the column member 14, a sufficient interference for the clamping of the screws can be ensured, and thus, stable and secure fixing can be attained.

Moreover, since the plate thickness of the race member 3 is not dependent upon the required depth of a screw for fixing the member to be driven, as in the prior art, the plate thickness may be reduced to a minimum thickness, allowing the slider to be made small and light in weight. As a result, the inertia of the slider 2 can be made small, allowing improved controllability at high speed and a reduction of residual vibrations to substantially zero.

The member to be driven is fixed to the slider 2 in the manner mentioned above and a manipulation force acts on the member to be driven, to move the slider 2 in the axial direction. The balls B inserted between the ball rolling grooves 1A and 3A roll with the movement of the slider 2, moving in the opposite direction to the movement of the slider 2. Subsequently, the direction of movement of balls B is changed at the end of the race member 3 by scooping projection 12. The balls B enter the curved ball groove 10, making a U-turn therein and pass through the ball return path 9 of the circulator 4, making another U-turn in the curved ball groove 10 at the opposite end of slider 2 to return to ball rolling grooves 1A and 3A thereby to circulate. In this case, the interval and the parallelism of both the ball rolling grooves 1A and 3A are maintained accurately, and the balls B move stably. Thus, the circulation of the balls B is very smooth.

While in this embodiment, the circulator 4 forming ball circulating paths 11 is constituted by joining two symmetrical members, the circulator 4 may constitute a single member which can be formed by injection molding at one time. In the latter case, the dimensional accuracy of the circulator 4 can be improved.

Furthermore, the column members 14 having threaded holes 15, for attaching the member to be driven, are formed on the cap 5 along the longitudinal direction near the opposite ends. By so doing, it is possible to narrow the width of the slider 2 and therefore the width of the linear guide apparatus thereby making the apparatus further compact. However, it is obvious that the number and the locations of the column members 14 may be changed arbitrarily if necessary.

In the embodiment, the side walls 1b and 1c of the guide rail 1 are perpendicular. However, the invention is not limited to this, and the side walls may be made slanted. In this case, it is only necessary to make the surfaces 3b and 3c of the race member 3 which oppose the side walls 1b and 1c slanted in parallel to the slanted side walls 1b and 1c of the guide rail 1.

As described in the foregoing, in the present invention, the slider is constituted by a thin-walled race member, a circulator made of synthetic resin which forms ball circulating paths, and a cap covering the circulator. Column members having a threaded hole for fixing a member to be driven are formed on the cap. The depth of the screw hole is sufficient to securely fix the member to be driven to the cap by the screws. The race member is formed with through holes for the column members. Consequently, the clamping force for screwing the member to be driven to the race member is not imparted to the race member, and deformation of the ball rolling grooves can be prevented. Furthermore, the slider and the member to be driven do not shake. As a result, the travelling and stopping of the slider are very smooth and accurately controlled. In addition, the race member can be made thin, and it is easy to make small in size and light in weight.

While certain embodiments of the invention have been described in detail above in relation to a miniature linear guide apparatus, it will be apparent to those skilled in the art that the disclosed embodiment may be modified. Therefore, the foregoing description is to be considered exemplary rather than limiting, and the true scope of the invention is that defined in the following claims.

What is claimed is:

1. A miniature linear guide apparatus comprising a guide rail having a U-shaped cross section with a bottom plate and side walls extending outwardly therefrom, axially extending ball rolling grooves formed in the inner surfaces of said side walls, and a slider formed by integrally assembling a race member having an inverted U-shaped cross section with an upper plate and side walls extending outwardly therefrom, axially extending ball rolling grooves formed in both outer side surfaces opposing respectively said ball rolling grooves of said guide rail, a circulator fitted within a recess of said race member having ball circulating paths formed as grooves in the inside thereof, and a cap for covering said ball circulating paths, said slider loosely fitted within said U-shaped cross section of said guide rail and supported therein through many roller balls interposed between said rolling grooves of said guide rail and said race member, an improvement comprising:
a column member, having a thread hold for attaching a member to be driven, extending outwardly from a surface of said cap facing said race member, and
a through hole, formed in said race member, through which said column member passes, formed at a position corresponding to said column member.

2. A miniature linear guide apparatus as defined in claim 1, wherein said circulator is formed by two halves divided along the axial line of said circulator.

3. A miniature linear guide apparatus as defined in claim 1, wherein said circulator is made of plastic.

* * * * *